(12) United States Patent
Peddada

(10) Patent No.: US 8,949,939 B2
(45) Date of Patent: *Feb. 3, 2015

(54) METHODS AND SYSTEMS FOR PROVISIONING ACCESS TO CUSTOMER ORGANIZATION DATA IN A MULTI-TENANT SYSTEM

(75) Inventor: Prasad Peddada, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,486

(22) Filed: Aug. 29, 2011

(65) Prior Publication Data

US 2012/0096521 A1 Apr. 19, 2012

Related U.S. Application Data

(60) Provisional application No. 61/392,796, filed on Oct. 13, 2010.

(51) Int. Cl.
*G06F 7/04* (2006.01)
*G06F 15/16* (2006.01)
*G06F 21/62* (2013.01)
*H04L 29/06* (2006.01)
*H04L 12/24* (2006.01)

(52) U.S. Cl.
CPC ............ *G06F 21/629* (2013.01); *H04L 63/105* (2013.01); *H04L 41/28* (2013.01)
USPC .............................................. 726/4; 709/229

(58) Field of Classification Search
CPC ...... G06F 21/629; H04L 41/28; H04L 63/105
USPC ............. 726/4, 5, 6, 1.3, 7, 28; 709/225, 223, 709/229; 705/51; 713/168, 169, 170
See application file for complete search history.

(56) References Cited

U.S. PATENT DOCUMENTS

| | | | | |
|---|---|---|---|---|
| 6,161,139 A * | 12/2000 | Win et al. | ...................... | 709/225 |
| 6,182,142 B1 * | 1/2001 | Win et al. | ...................... | 709/229 |
| 6,453,353 B1 * | 9/2002 | Win et al. | ...................... | 709/229 |
| 6,532,488 B1 * | 3/2003 | Ciarlante et al. | ............... | 709/205 |
| 7,249,373 B2 * | 7/2007 | Shewchuk et al. | ................ | 726/5 |
| 7,308,502 B2 * | 12/2007 | Rouault | ......................... | 709/229 |
| 7,631,346 B2 * | 12/2009 | Hinton et al. | ..................... | 726/8 |
| 7,831,833 B2 * | 11/2010 | Gaylor | ........................... | 713/176 |
| 8,117,640 B1 * | 2/2012 | Moriconi et al. | ................. | 726/1 |
| 8,321,402 B2 * | 11/2012 | Reeb | ............................. | 707/713 |

(Continued)

*Primary Examiner* — Abu Sholeman
(74) *Attorney, Agent, or Firm* — Dergosits & Noah LLP; Todd A. Noah

(57) ABSTRACT

Methods and systems are described for providing support representative access to applications deployed in an enterprise network environment. An access provisioning system defines a support user class in a user profile database for an application executed on an organization partition within the network. The support user is granted read only privileges to metadata of the application. An organization administrator can grant support personnel access to the application as a support user, thus the ability to view, analyze, and possibly modify the metadata. The access provisioning system generates a Security Assertion Markup Language (SAML) assertion upon request by the support personnel to enable access to the data to the extent of the granted privileges. The SAML protocol includes authentication of the support representative as an authorized support user within the system.

14 Claims, 14 Drawing Sheets

(56) References Cited

U.S. PATENT DOCUMENTS

| | | | |
|---|---|---|---|
| 8,327,426 B2* | 12/2012 | Kinser et al. | 726/8 |
| 8,688,802 B2* | 4/2014 | Sureshchandra et al. | 709/217 |
| 8,763,098 B2* | 6/2014 | Lee | 726/6 |
| 2002/0161733 A1* | 10/2002 | Grainger | 706/45 |
| 2003/0131232 A1* | 7/2003 | Fraser et al. | 713/156 |
| 2004/0025048 A1* | 2/2004 | Porcari et al. | 713/200 |
| 2005/0097352 A1* | 5/2005 | Patrick et al. | 713/200 |
| 2005/0102535 A1* | 5/2005 | Patrick et al. | 713/201 |
| 2005/0172116 A1* | 8/2005 | Burch et al. | 713/155 |
| 2005/0188370 A1* | 8/2005 | Kouznetsov et al. | 717/174 |
| 2005/0262362 A1* | 11/2005 | Patrick et al. | 713/193 |
| 2006/0123331 A1* | 6/2006 | Hightower et al. | 715/505 |
| 2006/0234678 A1* | 10/2006 | Juitt et al. | 455/411 |
| 2007/0039018 A1* | 2/2007 | Saslow et al. | 725/22 |
| 2007/0130326 A1* | 6/2007 | Raphael et al. | 709/224 |
| 2007/0271521 A1* | 11/2007 | Harriger et al. | 715/762 |
| 2007/0279671 A1* | 12/2007 | Shouno | 358/1.14 |
| 2007/0283012 A1* | 12/2007 | Chu et al. | 709/225 |
| 2008/0021866 A1* | 1/2008 | Hinton et al. | 707/2 |
| 2008/0163335 A1* | 7/2008 | Hagstrom | 726/1 |
| 2008/0263629 A1* | 10/2008 | Anderson | 726/2 |
| 2009/0158425 A1* | 6/2009 | Chan et al. | 726/21 |
| 2009/0293108 A1* | 11/2009 | Weeden | 726/6 |
| 2009/0327911 A1* | 12/2009 | Ningune et al. | 715/744 |
| 2010/0011412 A1* | 1/2010 | Maximilien et al. | 726/1 |
| 2010/0125612 A1* | 5/2010 | Amradkar et al. | 707/802 |
| 2010/0185963 A1* | 7/2010 | Slik et al. | 715/764 |
| 2011/0228940 A1* | 9/2011 | Shah et al. | 380/259 |
| 2011/0231918 A1* | 9/2011 | Shah et al. | 726/8 |
| 2012/0066755 A1* | 3/2012 | Peddada et al. | 726/8 |
| 2012/0096521 A1* | 4/2012 | Peddada | 726/4 |
| 2012/0144501 A1* | 6/2012 | Vangpat et al. | 726/28 |
| 2013/0145445 A1* | 6/2013 | Lee | 726/6 |
| 2013/0167237 A1* | 6/2013 | Amit et al. | 726/25 |
| 2013/0276070 A1* | 10/2013 | Lee | 726/4 |
| 2014/0068700 A1* | 3/2014 | Reilly et al. | 726/1 |
| 2014/0245389 A1* | 8/2014 | Oberheide et al. | 726/3 |

* cited by examiner

602↘  604↘

| Users | Profiles |
|---|---|
| Standard User | Permissions 1 |
| Super User | Permissions 2 |
| Administrator | Unlimited |
| License Manager (Hidden) | View setup configuration only |

METHODS AND SYSTEMS FOR PROVISIONING ACCESS TO CUSTOMER ORGANIZATION DATA IN A MULTI-TENANT SYSTEM

CLAIM OF PRIORITY

This application claims the benefit of U.S. Provisional Patent Application 61/392,796 entitled BLACK TAB REFACTORING PROJECT, by Prasad Peddada, filed Oct. 13, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to multi-tenant database systems, and more specifically to managing and monitoring security domains in multi-tenant database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The advent of on-demand service environments has facilitated the development and deployment of third party software and applications for common software platforms, such as enterprise application software platforms. In an on-demand services environment, an enterprise platform for a large number of users provides a number of applications for a variety of uses, such as customer service, order processing, communications, and so on. An enterprise software platform is required to support a number of different entities, such as platform providers, hardware vendors, application developers, end users, consultants, IT (information technology) professionals, and so on.

A multi-tenant architecture allows users or customer organizations (i.e., tenants) to share database resources that are organized as one logical database on one or more central server computers, as opposed to maintaining their own locally hosted databases and application programs. The centralized database tables themselves are typically shared and logical structures are employed to ensure differentiation and security among the different tenants. Likewise, the shared application programs can be segregated through access control mechanisms that restrict access and usage to only authorized users or subscribers. A large enterprise platform, such as the salesforce.com CRM platform may include thousands of developers and platform partners to support hundreds of thousands of end users. The issues of application deployment and maintenance can therefore be quite extensive with regard to customizing, integrating and extending the platform applications to create custom solutions for the users.

In a typical enterprise application network environment, database and application resources for a multitude of different end users may be supported by a central enterprise platform. The end users may be individuals or organizations that use the resources and store data on the enterprise platform server computers. Each end user accesses his or her resources by logging in using established login credentials.

A large-scale, multi-tenant database system involving many different users, organizations, and classes of users requires the robust implementation of security mechanisms to ensure that proper segregation and protection of data is maintained. This creates a number of different security domains within the system, and the corresponding access requirements for certain classes of users, such as administrators, tenants, end-users, support representatives, and the like. Under present systems, security and access protocols are typically implemented through the exchange of credentials between the various users (tenants, end users, vendors, and so on) and the platform administrators. Depending on the relationship between the users and the platform, and/or the amount of support or remedial work required, the exchange/setting up of credentials may impose a relatively high degree of administrative overhead. For example, exchanging credentials may require the establishment of new accounts for each service instance, or it may involve the transmission of potentially sensitive information over public communication networks and expose vulnerabilities with respect to spoofing and other hacking methods. Certain temporary access methods, such as screen-sharing techniques in which a user views and or assumes control of the end user computer screen through a console portal, similarly requires a high degree of interaction between the users and also exposes certain security vulnerabilities in the system. Thus, present methods of provisioning access in enterprise platform systems that rely on credential exchange or screen sharing present certain disadvantages with respect to processing overhead and system security.

Accordingly, it is desirable to provide techniques enabling efficient authentication and authorization of users for access to data in a multi-tenant database system.

BRIEF SUMMARY

In an embodiment and by way of example, there are provided mechanisms and methods for providing management and monitoring features to support users and partners in a CRM or Platform-As-A-Service system. In an embodiment, a management and monitoring feature is implemented based on Security Assertion Markup Language (SAML). In a multi-tenant system, the security domains could be managed by the same physical entity for management and monitoring. A user interface element is provided to allow the system administrator to manage their customers (tenants) and any other end users or third-party entities, and the SAML structure as the underlying mechanism for authentication and authorization. The authentication and authorization mechanism may be used in an access provisioning system that defines a support user class in a user profile database for an application executed within the organization resources in a multi-tenant system. The support user is granted limited privileges with respect to the metadata of the application. An organization administrator can grant the application vendor access to the application as a support user, thus allowing support representatives the ability to view, analyze, and possibly modify the metadata. The access provisioning system generates a Security Assertion Markup Language (SAML) assertions upon request by a support representative to enable access to the data to the extent of the granted privileges. The SAML protocol includes authentication of the support representative as an authorized support user within the system.

While one or more implementations and techniques are described with reference to an embodiment in which a method for providing an application package test scheme for multiple for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 6 is a table illustrating the creation of a support user within a user profile structure for a multitenant database system, under an embodiment.

DETAILED DESCRIPTION

Figure 1A:
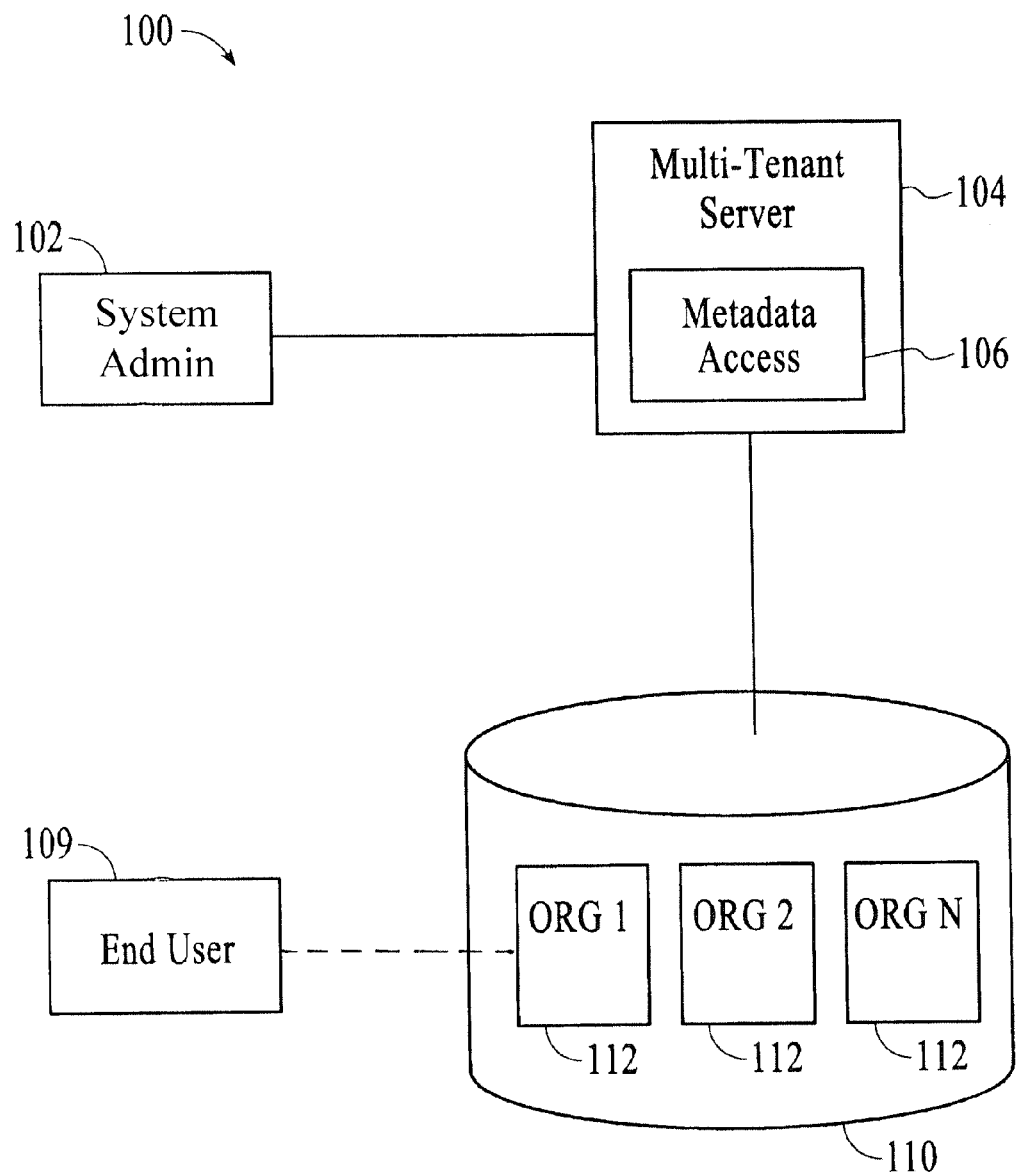
FIG. 1A illustrates an access provisioning component in a multi-tenant network environment, under an embodiment.

Systems and methods are described for providing access provisioning for organization resources in a multi-tenant database system. Access to the organization data is provided to system administrator support personnel and possibly third party technical providers without requiring the exchange of credentials or screen sharing techniques. Aspects of the one or more embodiments described herein may be implemented on one or more computers executing software instructions.

Embodiments are applicable to a computer network system comprising an enterprise platform providing an interface to centrally stored organization resources through a plurality of end users operating their own computers or terminals. The enterprise platform is configured to host application packages developed by application vendors and accessed by the end users. In an embodiment, the enterprise platform is a multi-tenant software environment in which single instances of application software runs on the platform server and serves multiple organizations that service the end users. In a multi-tenant system, each application is designed to virtually partition its data and configuration, and each client organization works with a customized virtual application instance. The enterprise platform may be used to implement a Software as a Service (SaaS) distribution model in which applications are hosted by a vendor or service provider and made available to end users over the network.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources are typically maintained in a server and data storage system maintained by a cloud platform provider, as opposed to computers within the actual client businesses themselves.

In an embodiment, a management and monitoring feature is implemented based on Security Assertion Markup Language (SAML). SAML is an XML-based standard for exchanging authentication and authorization data between security domains. In a typical multi-tenant system, the security domains are managed by the same physical entity for management and monitoring. The SAML structure comprises the underlying mechanism for authentication and authorization of a user interface that allows the system administrator to manage the tenants and any other end users or third-party entities. Authentication and authorization are defined as assertions where the identity provider produces assertions and the service provider consumes the assertions. An example of authorization could a user that is allowed to edit organization status, or impersonate users in the organization or tenant, or manage provisioning aspects of the system. For every tenant that gets provisioned, the system administrator creates a support user (also referred to as a "hidden user") to perform management of the tenant. For partners (e.g., application vendors, outside support staff, and so on), the system administrator creates a different support user for every package (e.g., application) deployed in every tenant. When the system administrator or application vendor needs to support a tenant they obtain a session to these tenant as these special support users. These support users have limited privileges that allow access only to the tenant metadata and not to the actual tenant data. In order for a user to obtain a session, such as an HTTP session, the system administrator generates a SAML authentication assertion for a hidden user in a given tenant. It also includes system administrator privileges to define which are additive administrative privileges applicable on top of the hidden user privileges as authorization assertions.

FIG. 1A is a block diagram that illustrates an access provisioning component in a multi-tenant network environment, under an embodiment. As shown in FIG. 1, system 100 includes a multi-tenant server 104 that maintains data for individual organizations (tenants) 108 in separate database portions 112 within a data store 110. In general, different tenant data may be stored in a single large database or in the same databases within the data store 110. Special fields differentiate the data for each of the tenants and each tenant user can access and control only their own data through special credential. In order to ensure privacy and security of the different tenant data stored in the database(s), robust security mechanisms are put in place to strictly restrict access to respective data only to authorized tenant personnel. In current systems, if tenant data is to be accessed by someone other than an authorized tenant user, the tenant user must provide the appropriate login credentials to this person.

In the system of 100, applications or other programs are installed for execution on the multi-tenant server computer 104 or other computers associated with the organization or the organization's end users 109. Certain information related to the applications may be represented or embodied in metadata that is associated with the installation and operation of the application in the organization resources. The applications may be provided by one or more independent software vendors (ISVs). The applications are generally used by the organization personnel to generated and process content data stored in the respective organization databases 112. The applications may also have metadata associated therewith. Such metadata typically comprises information regarding the data, but the not the content data itself. Other metadata associated with a tenant may include information regarding database resource usage, multi-tenant server resource usage, and other data that is ancillary to any specific content data.

As shown in FIG. 1A, a system administrator personnel (support user) is provided access to the metadata of an application running on a tenant through a metadata access component 106 of the server 104. This component 106 allows the system administrator 102 to access the metadata associated with the tenant or with the installed applications without requiring any exchange of credentials between the organization and the system administrator. In an embodiment, the data allowed to be accessed through the metadata access component 106 is restricted to the metadata of one or more applications for the tenant or metadata concerning the configuration or usage models of the tenant, and not to any of the actual content data for the tenant. Likewise, the metadata access component 106 is provided solely for use by the system administrator 102 or support personnel of the system administrator.

Figure 1B:
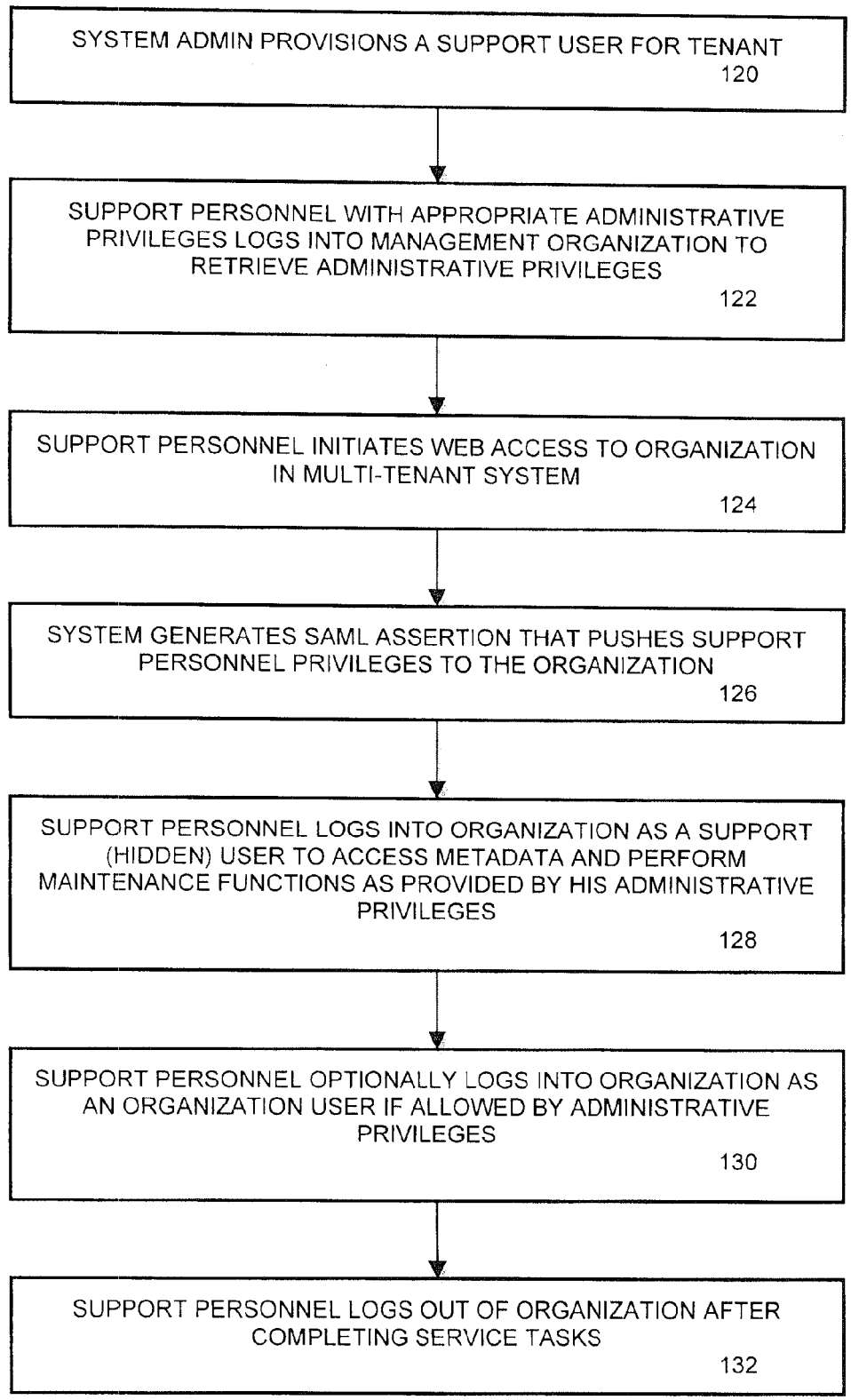
FIG. 1B is a flowchart that illustrates the process flow for metadata access using a SAML framework, under an embodiment.

FIG. 1B is a flowchart that illustrates the process flow for metadata access using a SAML framework, under an embodiment. The process of FIG. 1B may be initiated by a tenant organization requesting service from the system administrator. Such a service call may entail a trouble-shooting session or a resource request. In a multi-tenant system, a typical request to a system administrator may include a request to increase the request limit to allow a greater number of database requests. Such a request typically requires a modification of metadata associated with the tenant organization, such as organization value limits, and so on. Certain support personnel of the system administrator may be tasked with performing such acts. In response to such a request, the system administrator provisions the tenant to accept service from the appropriate system administrator support personnel. When the tenant is to be supported, a support user (hidden user) is granted certain sys admin capabilities to allow the support personnel to support this tenant, block 120. Such a support personnel may be denoted by a special identifier within the system administrator database. For example, the tenant may be recognized with a tenant ID 00D000000000001, and the support user account username could be of the format sfdcadmin@00d000000000001.

Figure 1C:
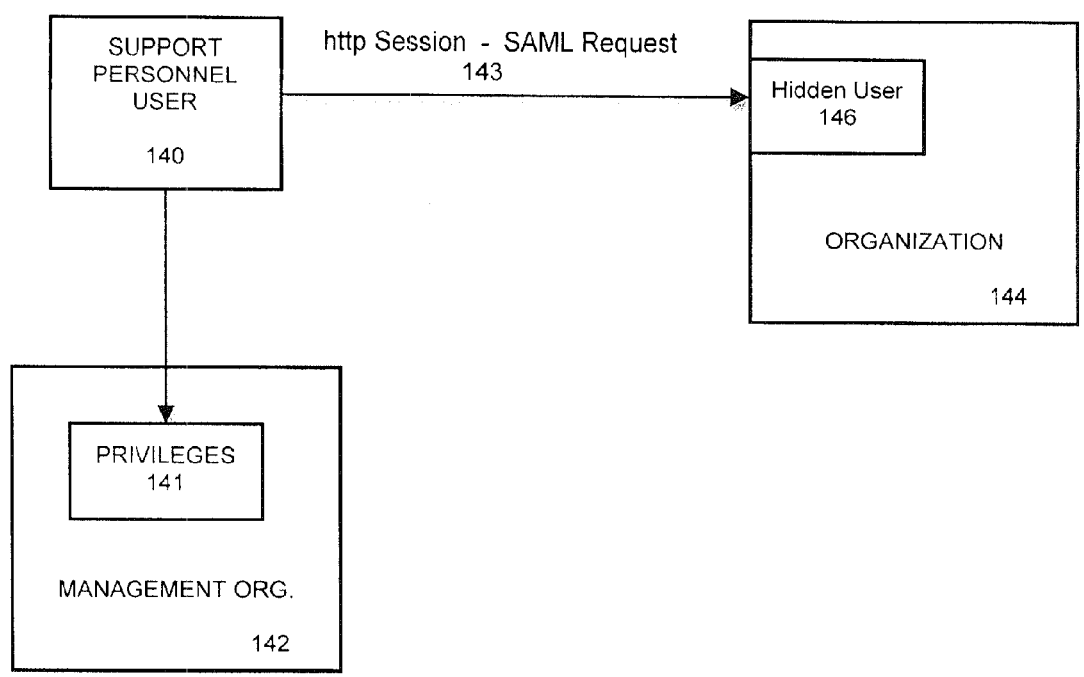
FIG. 1C is a block diagram illustrating access by support personnel into a tenant organization using a SAML framework, under an embodiment.

The designated support person may have special privileges that allow him or her to perform certain tasks with respect to the tenant organization. For example, the support person may have the capability to increase request limits for their tenants, along with the capability to impersonate users in the tenant organization. Other support persons may have greater or fewer such defined privileges with respect to this or other tenant organizations within the multi-tenant system. The privileges for the support person are stored in the management organization personnel database. This is illustrated in FIG. 1C, which is a block diagram that illustrates the access by support personnel into a tenant organization using a SAML framework, under an embodiment. As shown in FIG. 1C, the support representative 140 has certain privileges 141 defined by and stored within the management organization 142. This is the single source of truth for support representatives, and defines and limits the tasks that the support representative can perform with respect to the tenant organization 144. With reference to FIG. 1B, the process proceeds with the support person logging into his management organization where his administrative privileges are defined, block 122.

In block 124, the support person initiates a web access to the tenant organization 144. In an embodiment, this entails the support person clicking a link on a user interface that redirects the support person to a servlet (or equivalent function) that generates SAML assertions that includes a authentication assertion for the support person (e.g., sfdcadmin@00d000000000001). As shown in block 126, the SAML assertion effectively pushes the support person's administrative privileges from the management organization 142 to the tenant organization 144. In an embodiment, the servlet performs an HTTP POST redirect with SAML assertions to a specified login URL (e.g., https://login.salesforce.com), which flows through a normal login process to allow the support person to log into the tenant organization. The SAML assertions are decrypted and upon validation create an HTTP session for the user that includes recording the service persons' administrative capabilities. This is illustrated in FIG. 1C as the HTTP session link 143 between support person 140 and organization 144. Thus, if the support person is allowed to increase a request limit and impersonate users in the tenant organization, these privileges are pushed and persisted in the http session that is initiated between the support person and the tenant organization.

As shown in block 128 of FIG. 1B, the support user can log into the organization 144 as a support user (hidden user) 146. The hidden user 146 definition and status allows the support person to only access the metadata of the organization. The maintenance functions that can be performed by the support person through this interface are thus limited to maintenance functions performed on metadata and the limits defined by the support person's defined privileges 141. The http session 143 thus allows the support person to access the tenant organization with the privileges of the hidden user along with administrative privileges of the support person. If the support person is able to impersonate an actual user of the tenant organization, he can then log into the organization 144 as this organization user, block 130. This may allow the support user to perform additional tasks, as defined by the privileges of the organization user, and which may give access to most of the tenant data that the user has access to. Once the support person has completed any assigned tasks, he may then log out of the tenant organization, block 132.

As shown in embodiments of FIGS. 1B and 1C, the support person obtains an HTTP session that generates a SAML authentication assertion for a hidden user in a given tenant organization. The assertion includes the system administrator privileges (for example a bit vector) to define which any additive administrative privileges that may be applicable on top of the hidden user privileges as authorization assertions. One advantage of tying administrative privileges to an HTTP session allows the system to apply different administrative privileges to the same support user while representing different support personnel administrative privileges. Thus tagging administrative privileges to a user session allows multiple support personnel to impersonate the same support user but with different administrative capabilities as defined in their management organization. Thus, for example, if a second support person goes through the same exercise and if she is only allowed to impersonate users, then her session will be restricted to impersonating users in the tenant even though the two support users may have obtained a session to the organization as the same (sfdcadmin@00d000000000001) support user.

As described above, a Security Assertion Markup Language (SAML) structure is used to implement the access provisioning system used in the multi-tenant support system described above. SAML is an XML-based open standard for exchanging authentication and authorization data between security domains, that is, between an identity provider (a producer of assertions) and a service provider (a consumer of assertions). SAML facilitates the implementation of web browser single sign-on capability and assumes that the user has enrolled with an identity provider to identify the user to a service provider. At the user's request, the identity provider passes a SAML assertion to the service provider, and on the basis of this assertion, the service provider makes an access control decision. In the access provisioning system, partners login into their customer orgs as this user by leveraging SAML directives. Customers first grant access for the partner (publisher) to view metadata in their organization. Support personnel can then request a user session to the customer organization, which involves generating SAML assertions and redirecting the user to the customer organization. Generation of SAML assertions for the support user may be accomplished by a servlet that is provided by the system administrator or platform provider.

Embodiments implement a standard SAML protocol to describe how SAML elements are packaged within SAML request and response elements, and the processing of these elements within the system. The SAML protocol basically consists of the following framework:

[RESPONSE[ASSERTION[AttributeStatement]]]

where an assertion contains statements that service providers use to make access control decisions, and the statements assert that the user did indeed authenticate with the identity provider at a particular time using a particular method of authentication. An attribute statement asserts that a subject is associated with certain attributes, and an attribute is a name-value pair.

In an embodiment in which a SAML-based access provisioning mechanism is provided in the multi-tenant database system of FIG. 1, the multi-tenant server 104 administrator acts as the identity provider to identify an ISV personnel for the customer organization.

A sample generated assertion in SAML for the access provisioning system is as follows:

SAML Assertion

```
<samlp:Response .....
  <saml:Assertion
ID="_ccf5f944ada504234e6dbbacb9c3a0811285022318842" IssueInstant
="2010-09-20T22:38:38.835Z" Version="2.0"
xmlns:saml="urn:oasis:names:tc:SAML:2.0:assertion">.....
    </saml:AuthnContext>
  </saml:AuthnStatement>
  <saml:AttributeStatement>
    <saml:Attribute FriendlyName="btAttrib" Name="btsettings"
NameFormat="urn:oasis:names:tc:SAML:2.0:attrname-
format:unspecified">
      <saml:AttributeValue
xmlns:xs="http://www.w3.org/2001/XMLSchema" xmlns:xsi="
http://www.w3.org/2001/XMLSchema-instance"
xsi:type="xs:string">p1=354545|p2=446
56454|l1=PILOT|l2=GOD|l3=PILOT</saml:AttributeValue>
......
  </saml:AttributeStatement>
  </saml:Assertion>
</samlp:Response>
```

A sample full SAML response for the above assertion is as follows:

Full SAML Response

```
<samlp:Response ID="_c1a10af5e2fc5766a1e706d4a51bd5b71285022318842"
IssueInstant
="2010-09-20T22:38:38.835Z" Version="2.0"
xmlns:samlp="urn:oasis:names:tc:SAML:2.0:protocol">
  <saml:Issuer Format="urn:oasis:names:tc:SAML:2.0:nameid-
format:entity" xmlns:saml=
"urn:oasis:names:tc:SAML:2.0:assertion">
https://www.salesforce.com</saml:Issuer>
  <samlp:Status>
    <samlp:StatusCode
Value="urn:oasis:names:tc:SAML:2.0:status:Success"/>
  </samlp:Status>
  <saml:Assertion ID="_ccf5f944ada504234e6dbbacb9c3a0811285022318842"
IssueInstant
="2010-09-20T22:38:38.835Z" Version="2.0"
```

-continued

```
xmlns:saml="urn:oasis:names:tc:SAML:2.0:assertion">
    <saml:Issuer Format="urn:oasis:names:tc:SAML:2.0:nameid-
format:entity">https://www.salesforce.com</saml:Issuer>
        <saml:Subject>
            <saml:NameID Format="urn:oasis:names:tc:SAML:1.1:nameid-
format:unspecified">p
peddada@salesforce.com</saml:NameID>
            <saml:SubjectConfirmation
Method="urn:oasis:names:tc:SAML:2.0:cm:bearer">
                <saml:SubjectConfirmationData NotOnOrAfter="2010-09-
20T22:39:38.835Z" Recipient="https://login.salesforce.com"/>
            </saml:SubjectConfirmation>
        </saml:Subject>
        <saml:Conditions NotBefore="2010-09-20T22:38:38.835Z"
NotOnOrAfter="2010-09-20T22:39:38.835Z">
            <saml:AudienceRestriction>
                <saml:Audience>https://saml.salesforce.com</saml:Audience>
            </saml:AudienceRestriction>
        </saml:Conditions>
        <saml:AuthnStatement AuthnInstant="2010-09-20T22:38:38.842Z">
            <saml:AuthnContext>
                <saml:AuthnContextClassRef>
urn:oasis:names:tc:SAML:2.0:ac:classes:unspecified</saml:AuthnContextClassRef>
            </saml:AuthnContext>
        </saml:AuthnStatement>
        <saml:AttributeStatement>
            <saml:Attribute FriendlyName="btAttrib" Name="btsettings"
NameFormat="urn:oasis:names:tc:SAML:2.0:attrname-format:unspecified">
                <saml:AttributeValue xmlns:xs="http://www.w3.org/2001/XMLSchema"
xmlns:xsi="http://www.w3.org/2001/XMLSchema-instance"
xsi:type="xs:string">p1=354545|p2=446
56454|l1=PILOT|l2=GOD|l3=PILOT</saml:AttributeValue>
                <saml:AttributeValue xmlns:xs="http://www.w3.org/2001/XMLSchema"
xmlns:xsi="http://www.w3.org/2001/XMLSchema-instance"
xsi:type="xs:string">SomeOtherValue</saml:AttributeValue>
            </saml:Attribute>
            <saml:Attribute Name="ssostartpage"
NameFormat="urn:oasis:names:tc:SAML:2.0:attrname-format:unspecified">
                <saml:AttributeValue xmlns:xs="http://www.w3.org/2001/XMLSchema"
xmlns:xsi="http://www.w3.org/2001/XMLSchema-instance"
xsi:type="xs:anyType">http://ppeddada
-ws:8080/qa/security/saml/saml20-gen.jsp</saml:AttributeValue>
            </saml:Attribute>
            <saml:Attribute Name="logouturl"
NameFormat="urn:oasis:names:tc:SAML:2.0:attrname-format:uri">
                <saml:AttributeValue xmlns:xs="http://www.w3.org/2001/XMLSchema"
xmlns:xsi="http://www.w3.org/2001/XMLSchema-instance"
xsi:type="xs:string">http://ppeddada-
ws:8080/qa/security/del_auth/SsoLogoutPage.html</saml:AttributeValue>
            </saml:Attribute>
        </saml:AttributeStatement>
    </saml:Assertion>
</samlp:Response>
```

For the embodiment described above, the metadata access component 106 utilizing the SAML framework allows one or more system administrator support personnel to access a tenant organization to perform certain support or customer service requests that involve access to the organization metadata. Further tasks may be allowed if the support person is allowed to impersonate an actual organization user. In general, service requests by the tenant organization are typically made to the system administrator, since it is the system administrator who is responsible for managing the processing and storage resources of the multi-tenant system. In certain cases, however, one or more third parties may be responsible for providing certain of the resources used by the tenant organizations. In this case, the service requests may implicate these third parties. A typical scenario may involve a third-party ISV who has provided an application or package that is executed by a tenant on the multi-tenant system.

In an embodiment, the metadata access component 106 enables a setup (or metadata) access interface that allows vendors (publishers) and support representatives to support organizations 112 who have installed one of their applications. With metadata access, subscriber administrators may grant access to package publisher support personnel. Once they have been given access, the publisher support personnel may log into the customer's organization to identify post-installation usage problems and perform other support tasks. Through this interface, access is generally limited to read-only access to application setup functions, and helps ISVs troubleshoot problems that are caused by organization specific configurations.

In an embodiment, the enterprise server is maintained by a company that supports the installation of third party applications and packages to individual organizations in an on-demand services environment. To help support independent ISVs, a package support access (PSA) system may be implemented that helps partners support their subscribers without exchanging credentials. In general, the PSA interface works similarly to a grant login function where users may grant login access to their administrator or to an outside support person. With the PSA interface, subscribers may grant access to package publisher support personnel. The package publisher support personnel can then log into the customer's organizations to identify installation problems, reproduce problems experienced by specific users, run diagnostics, check or install patches, or perform other similar support activities. Aspects of a PSA system that may be used in conjunction with embodiments herein are described in co-pending U.S. patent application Ser. No. 13/229,102, entitled "Method and System for Installing Managing and Monitoring of a Multi-Tenant System," which is hereby incorporated in its entirety.

For purposes of the following description, the term "publisher" refers to an ISV who offers a managed and licensed package through the platform. Such a platform may have a central exchange or store database or public repository that allows developers to catalog applications that have been developed for the platform, and allows users to search for, purchase, and download available applications. Such an exchange may be referred to as an "application exchange" ("AppExchange"), "application store" ("AppStore") or other similar name. The term "subscriber" or "subscriber organization" refers to a company, organization or user that has installed the publisher's package into their organization. The term "package" refers to an application program or set (suite) of application programs that run on the subscriber's environment (or workspace) within the platform. A License Management Application (LMA) is a free managed package created by the overall system administrator and is available on the exchange and that lets publishers license their packages and manage subscriber package licenses. A License Management Organization (LMO) is the publisher organization that has installed an LMA and associated their package with that LMO.

The access provisioning system gives publishers and other partners the ability to login into their customer's organizations to view the customer's metadata. Such an access provisioning system may be used in a PSA system, or similar system, in which customer organizations have installed application packages managed by a vendor, publisher, or other partner entity. In an embodiment, the packaging framework creates a License Manager User for every managed package created in the organization. The License Manager User is a restricted user with read only access to meta-data.

Figure 2:
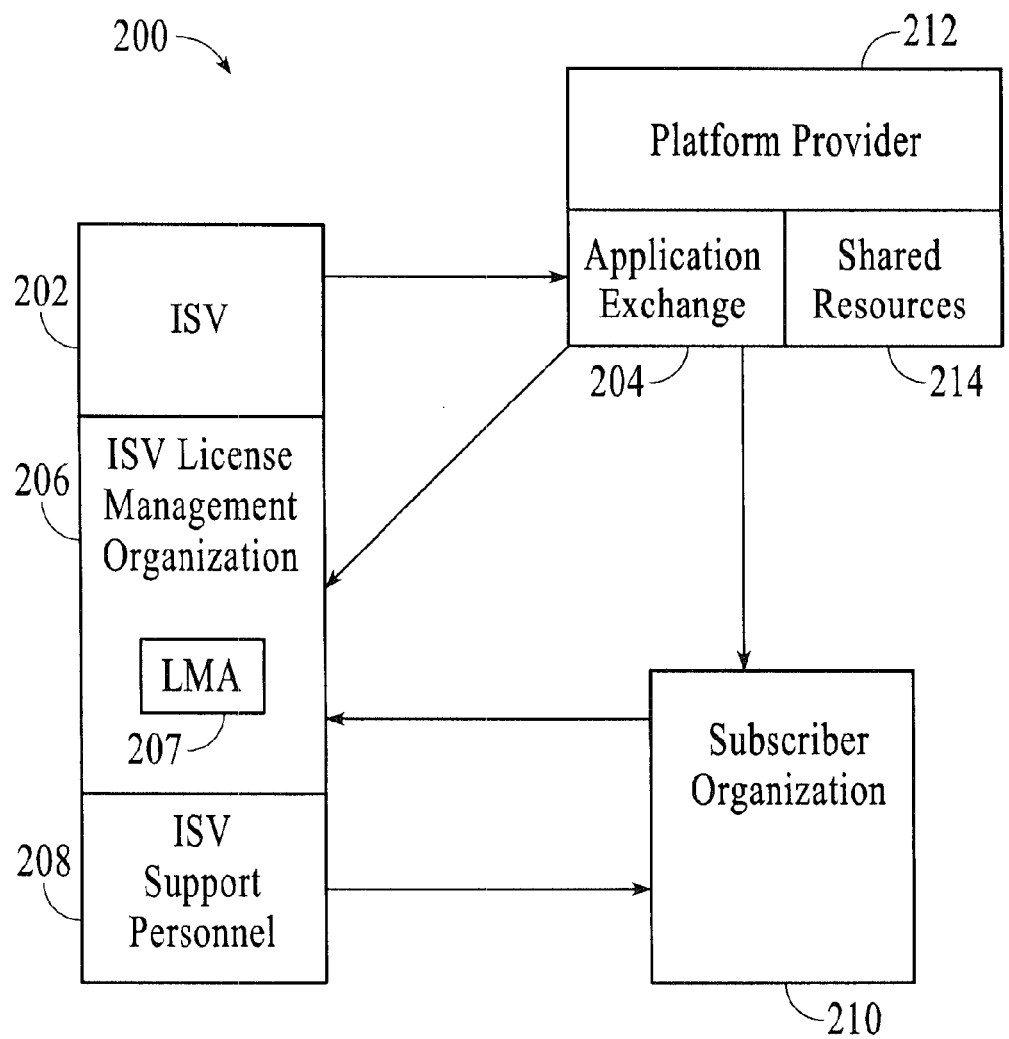
FIG. 2 illustrates a computer network system 100 that implements one or more embodiments of a package support access system for multi-tenant applications.
Figure 3:
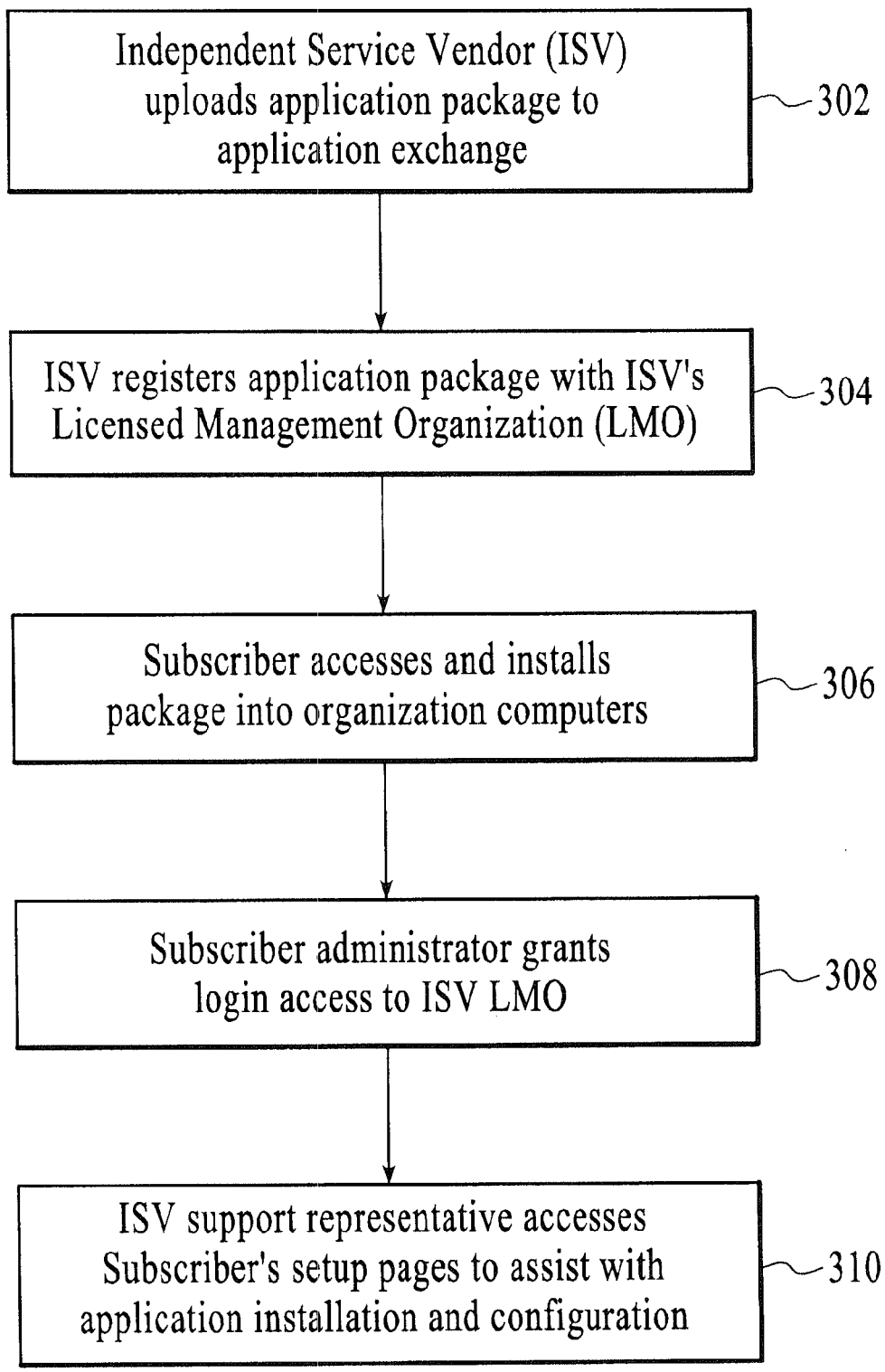
FIG. 3 is a flowchart illustrating a process of implementing a package support access framework, under an embodiment.

FIG. 2 illustrates a computer network system 100 that implements one or more embodiments of a package support access system that uses an access provisioning method for multi-tenant applications. The system 200 of FIG. 2 is discussed in relation to the process flow for package support access between an ISV and a subscriber organization, as illustrated in FIG. 3. FIG. 3 is a flowchart illustrating a process of implementing a package support access framework, under an embodiment. The system 200 of FIG. 2 illustrates an enterprise network environment, such as a multi-tenant database system in which a platform provider 212 provides resources 214, such as storage space, applications, databases, and other resources to a plurality of subscriber organizations 210. Such subscribers are typically companies that run enterprise software applications and store and process large amounts of data for their end users.

As shown in FIG. 2, an ISV or developer organization creates an application or application package and uploads the package to an application exchange 204, or similar database, step 302. The ISV registers the uploaded package with an ISV's License Management Organization (LMO) 206, step 304. The subscriber 210 can access the uploaded package in the application exchange database 204, and download and install the program or programs of the package for execution on the platform, step 306. The subscriber administrator grants access to the subscriber organization resources to authorized support personnel 208 through the LMO 206, step 308. This allows ISV support personnel 208 to access the subscriber organization's metadata to assist with package configuration, and maintenance, step 310.

Depending on the actual enterprise-level network implementation, there may be several prerequisites that must be satisfied by both the publisher and subscriber in order to use the package support access interface. These prerequisites ensure the protection and security of the subscriber organization to prevent data loss and other security breaches in the subscriber organization. In a typical large-scale multi-tenant environment, the overall platform provider 212 may provide a license management application (LMA) 207 that allows vendors to utilize the package support access technology. When an ISV installs the LMA it becomes a license management organization 206. Thus, for the embodiment of FIG. 2, for the ISV publisher, the publisher's package must be licensed with the License Management Application (LMA). Only users in the package's License Management Organization may access subscriber organizations. Users who want to access subscriber organizations may require special privileges, such as "permit user to login in to subscriber org" user permission by an administrator in the publisher's LMO organization. To protect the security of subscriber organizations, only trusted support and engineering personnel are typically given this permission. For the subscriber, the prerequisites are that the subscriber must have installed an LMA-licensed package 207 from the publisher, and the LMA-licensed package must have a valid license. An administrator must have granted access to the publisher under appropriate setup controls such as checking a check box or inputting a future date for access by the authorized personnel.

The LMA 207 gives the ISV publisher the ability to perform certain tasks regarding the applications installed in the subscriber organization 210 resources. For example, the ISV can track when applications are installed for a user, sales leads can be generated, licenses can be monitored and terminated if necessary, and other similar capabilities. The LMA thus gives an ISV the ability to manage licenses and the application packages. The LMA in conjunction with certain metadata access functions allows the ISV the ability to actually log in to the subscriber as a user or support user.

As stated above, the package support access interface includes a metadata access portion that gives the publisher support personnel read-only access the data of a subscriber organization (such as through a Setup or Application Setup area). The user login portion of the PSA allows publisher support personnel to impersonate a specific subscriber user. Subscriber organizations must grant access to setup to a publisher before the publisher may use the user login feature.

Metadata access gives publisher support personnel read-only access to the Setup|App Setup area of a subscriber organization. This includes the pages under the Create, Customize, Develop, and Deploy sections. Metadata access provides a way to troubleshoot common configuration issues that may be causing problems or preventing the operation of a package, such as a trigger or a page layout issue. Such configuration issues may commonly occur after initial package installation particularly when the package requires manual configuration on the part of the subscriber administrator. Metadata access lets the publisher examine the state of the subscriber organization and give direction to the subscriber administrator, but does not let the publisher make changes themselves. When using metadata access, publishers do not have access to any other portions of setup, nor do they have access to the subscriber's data.

Access to the PSA function by both the publisher and subscriber depends on the user interface implemented within the system. In an embodiment, in order to use metadata access, publisher support personnel selects a License Management Application in the application picker in the GUI screen. A "Subscriber Support" tab should appear as part of the tabs associated with the LMA. A subscriber support tab lists the possible subscriber organizations. Unlisted subscribers will require asking the subscriber's system administrator to grant access. A Package Support Access page lists the publishers and packages and appropriate access links redirect into the subscriber's organization. Once inside the subscriber organization, the subscriber's App Setup tree will be displayed allowing the publisher to navigate into the tree to view the subscriber's configuration.

To give a publisher metadata access through the PSA, the subscriber administrator optionally has to grant access to the publisher in the form of a data or a check box for such access.

The user login function gives publisher support personnel the ability to impersonate a specific user in the subscriber organization. This is useful if the subscriber administrator cannot perform troubleshooting work related to the package and wants publisher support personnel to do the work. User login is also useful for reproducing problems experienced by a specific user due to their unique data set, role, profile, page layout, or other attributes. User login is only possible if the subscriber's administrator has first granted metadata access on the Package Support Access page. In addition, the user whose identity is to be used must grant access on the Grant Login Access page under the appropriate setup page. The user must go to this page, find the line listing the package/publisher name and enter a date in the future for such access. Once the subscriber has performed these tasks, the publisher will see a list of users who have granted access on the top-level application setup/user login page that is displayed when they initially access the subscriber organization. The publisher can then click the "login" link next to the user's name and they will then impersonate become that subscriber user. In this manner, the publisher has gained access to the subscriber organization as an actual subscriber user, and will have all the rights and access to the subscriber system that the particular user does with few restrictions.

In an embodiment, certain security mechanisms are implemented to limit publisher access to the subscriber organization and data. First, an ISV's access is limited to Setup or App Setup regions and are not allowed to make any changes and are prevented from accessing the subscriber organization's data. This generally provides a low-risk level of access that is safer than providing a publisher with a subscriber user's credentials or letting them login directly as a user. To prevent the grant metadata access from giving the ability of publishers to log in as subscribers, metadata access should only be granted to package publishers that are trusted. A time limit may be imposed to grant access for only short periods of time (e.g., a few days or hours), such as is necessary to troubleshoot the targeted problem. In addition, strict revocation privileges may be retained to allow the subscriber to revoke both the metadata access and user login grants at any time.

Figure 4:
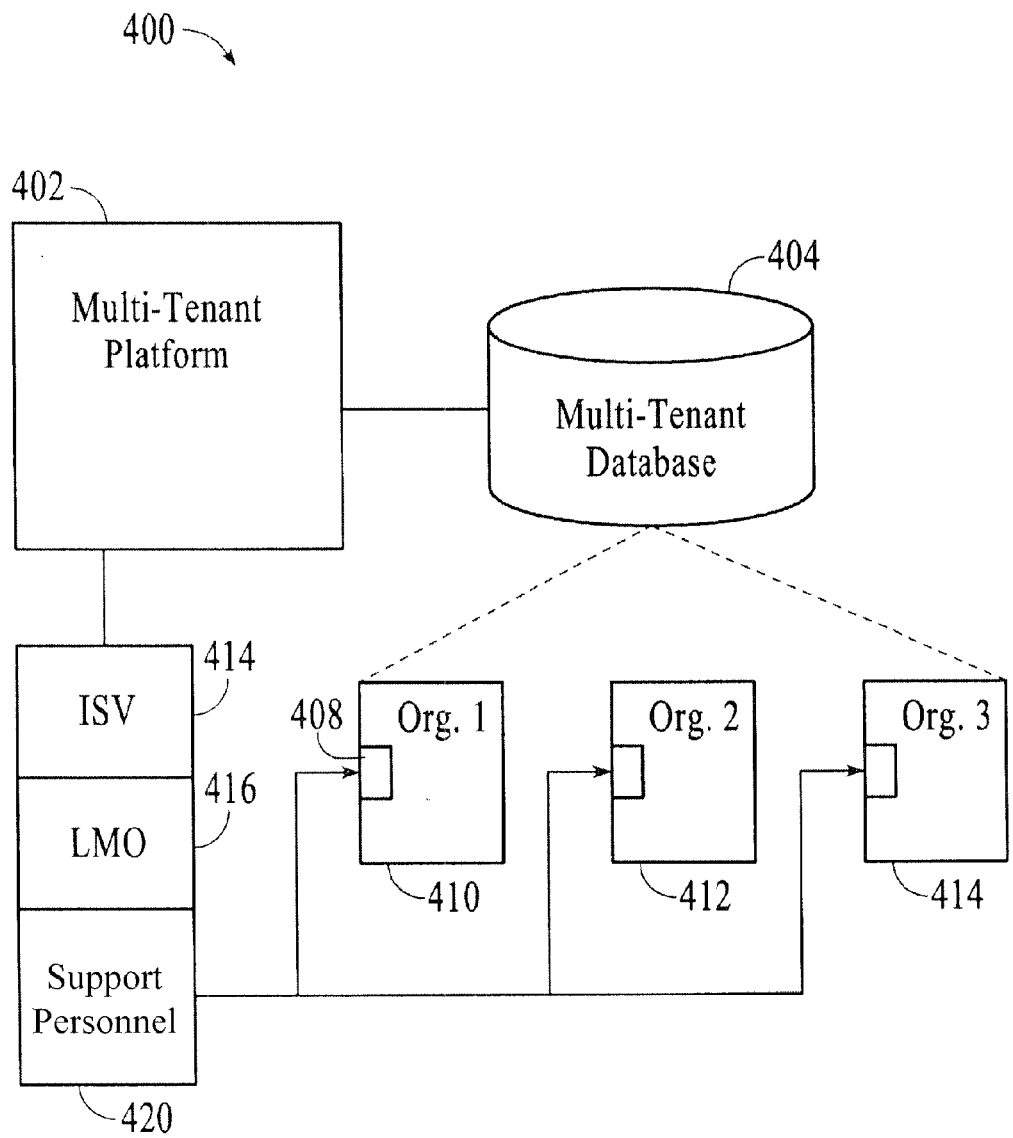
FIG. 4 is a block diagram illustrating support user interfaces into organizations through a package support access system in a multi-tenant network environment, under an embodiment.

FIG. 4 is a block diagram illustrating support user interfaces into organizations through a package support access system in a multi-tenant network environment, under an embodiment. In system 400, a multitenant platform 402 includes a large multitenant database 404 that stores data, applications, and other resources for a plurality of organizations 410-414. The data is stored, segregated, and maintained in accordance with standard multitenant methods known to those of ordinary skill in the art. Each organization maintains a separate account within the multitenant platform and accesses their respective account through established credentials (e.g., username/password). One or more ISV's 414 and their respective LMO's 416 interact with the multi-tenant platform 402 and database 404 to load applications for use by the organizations, as described above.

In an embodiment, the package support access technology creates a support user interface 408 into each organization 410-414. This support user interface allows an ISV to provide direct technical support through appropriate technical personnel 420 directly into the organization applications maintained on the multi-tenant platform 402. A unique support user interface 408 is created for each application for each organization. The support user interface allows the ISV technical personnel 420 to log into the organization resources or multitenant account with read-only access privileges. In one embodiment, the support user access only allows access to organization metadata. In general, metadata is data about data. Metadata can encompass a wide variety of types and categories. Within the computer network context, metadata can be categorized as three main types: technical metadata, business metadata and process metadata. Technical metadata is primarily definitional while business metadata and process metadata are primarily descriptive. Technical metadata defines the objects and processes in a data warehouse system, as seen from a technical point of view. The technical metadata includes the system metadata, which defines the data structures such as tables, fields, data types, indexes and partitions in the relational engine, and databases, dimensions, measures, and data mining models. Technical metadata defines the data model and the way it is displayed for the users, with the reports, schedules, distribution lists and user security rights. Business metadata is content from the data warehouse and specifies what the data is, where it comes from, what it means and what its relationship is to other data in the data warehouse. Process metadata is used to describe the results of various operations in the data warehouse, and can include start time, end time, CPU seconds used, disk reads, disk writes and rows processed. Such process data is particularly useful when troubleshooting certain processes. The metadata accessed by the technical personnel 420 through the support user interface can include any or all of these different types of metadata, along with any other relevant data.

Block 408 in FIG. 4 represents a support user that is created for an application in the corresponding organization, e.g., organization 1, 410. The support user can be defined using a profile definition in an appropriate user database for the organization. The profiles establish the license definitions for the various users and their permissions in the organization. Each user is associated with a security profile, and the security profile dictates what a user can do within the organization with respect to the data and resources in the system 400. FIG. 6 is a table illustrating the creation of a support user within a user profile structure for a multi-tenant database system, under an embodiment. Table 600 represents a user profile table that is created for each organization and lists the users in a first column 602 and their corresponding profiles in a second column 604. The user profiles specify the privileges or permissions of the users with respect to the applications or other resources in the organization. For the example table of FIG. 6, the users include standard users who are granted a first level of permissions, such as create, read, update and other privileges, super users who are granted a greater set of permissions, and administrators who are granted unlimited permissions. In an embodiment, a support user is created automatically upon installation of an application. The support user may be a license manager for the ISV and by default is granted only limited permissions to view the setup configuration files. This essentially allows the support user read only access to the application metadata. The support user class is created automatically upon installation of an appropriate application using the package support access framework. Although the support user class is automatically created, access as a support user by an ISV must be granted by the organization in a separate access grant procedure. In a multitenant environment, table 600 is stored in an appropriate definitions area for the organization.

In an embodiment, granting access through the support user interface 408 to view metadata only does not require further permissions to be granted by either the organization administrator or multi-tenant platform administrator. Viewing the metadata allows the technical personnel to investigate many potential problems associated with the loading of the ISV's application. The support user interface may be automatically created upon the installation of the application in the organization site. This allows the technical personnel to access the organization metadata for the application on a read-only basis. Any further access to the organization, such as read/write access privileges to customer data must be granted by the administrator.

Figure 5:
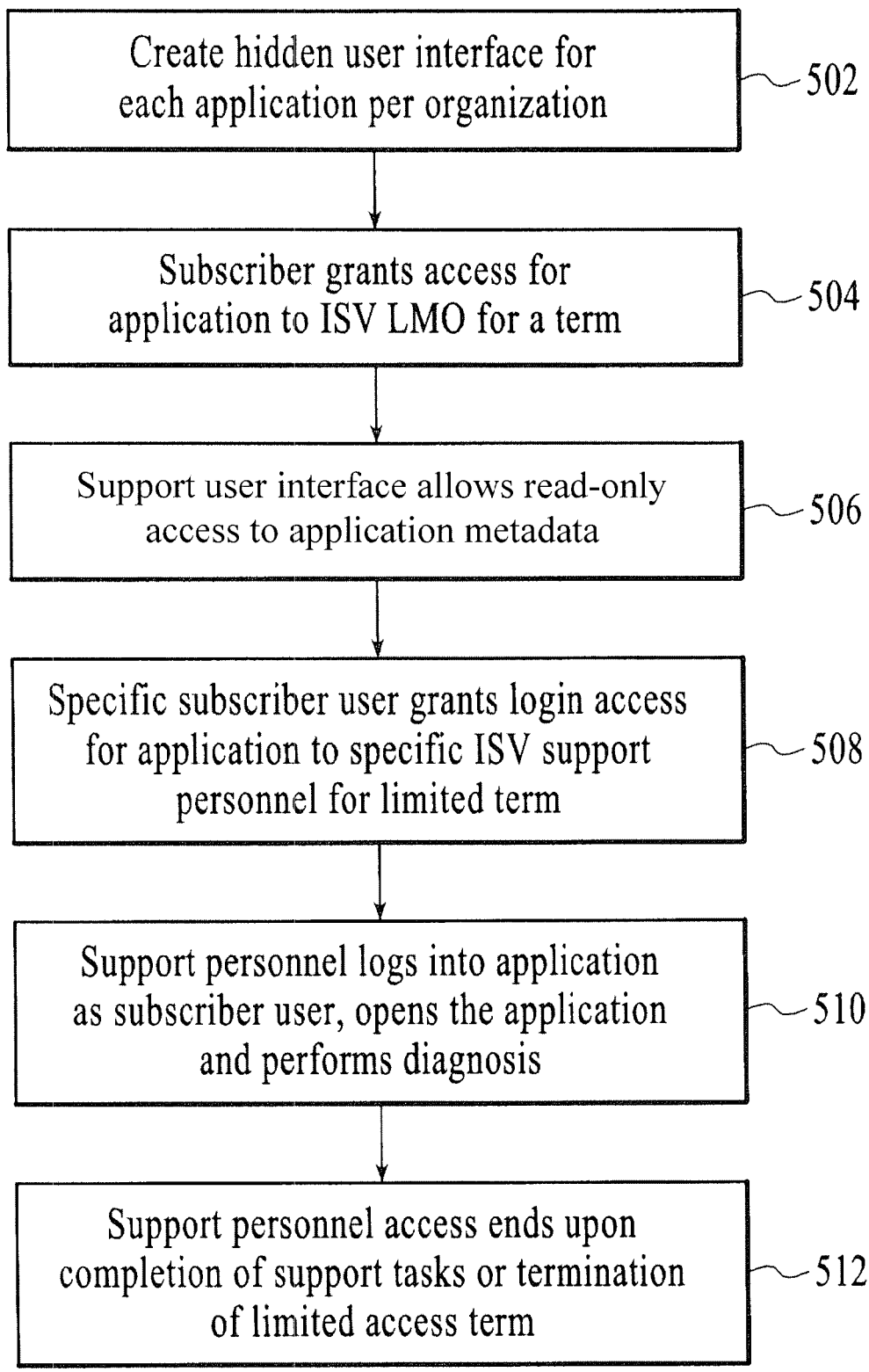
FIG. 5 is a flowchart illustrating a process of implementing granting access to an ISV through a package support access framework, under an embodiment.

FIG. 5 is a flowchart illustrating a process of implementing granting access to an ISV through a package support access framework, under an embodiment. The installation of a package support access application in the multitenant environment of system 400 will automatically create a support user interface for each application per organization, block 502, such as illustrated with reference to FIG. 6. The support user class enables access to the organization data to a special allowed set of users. The subscriber allows ISV personnel to view the appropriate metadata through a specific support user access grant, step 504. Typically this access is granted for a relatively long fixed period of time, such as one year.

In certain cases, after the installation of an application for an organization, the organization administrator or organization customer (end user) may notice a problem or issue with the application. This is reported to the ISV by the organization or the multitenant platform administrator. At this point, ISV technical personnel may log into the organization application using the support user interface 408 and attempt to identify and fix the problem by analyzing the relevant metadata, step 506. If the metadata alone is sufficient to reveal the issue and facilitate a solution, the ISV may then issue a fix and accordingly inform the organization or issue a patch. If however, analysis of the metadata alone is not enough to fix the problem, the technical personnel may need to log into the actual application as it is executing to analyze and diagnose the problem. In this case, the subscriber administrator grants access for the application to the ISV support personnel to log in as a regular (subscriber) user, block 506. Typically, this access is granted for only a limited term, such as one or more days, weeks, months, or any appropriate period of time. The limited access is configured to automatically terminate upon the completion of the term. The limited access may be provided in the form of a unique user name and password given to the technical personnel. The technical personnel can then log into the application through their own console (e.g., web) interface using this credential set. The limited access may be granted for any appropriate access based on role-based permissions, business rules, and so on. For example, a limited access grant may only allow the technical support personnel to log in as a regular user with read and limited write capabilities, or it may allow them to log in as a super user or administrator with greater read/write capabilities. In an embodiment, the technical support personnel may be allowed to log in as a CRUD user, that is, one with create, read, update, and delete privileges associated with data storage functions. Additional privileges may also be granted to allow the user to perform specific debugging and modification tasks.

In a practical deployment application, the identity of appropriate support personnel 420 for each ISV would be made available to the organizations 410-414. In this manner, special permissions and access rights could be granted by the organizations to the proper personnel. This also allows different support personnel to be granted different access rights depending upon their identity. In addition, each organization may have one or more specific users that are allowed to grant access to the appropriate technical personnel. This allows the interface between the ISV support representatives and the subscriber administrators to list available log in options in an efficient manner, thus reducing the amount of necessary interaction between the people themselves. Thus, as shown in FIG. 5, once the subscriber administrator has granted the ISV LMO access to the application beyond just the metadata, a specific subscriber user will grant log in access to specific technical support personnel to open and use the application, block 508. This support representative can then open the application and perform whatever diagnostic/remedial tasks are required to try to fix the problem, block 510. Essentially, once the support representative is logged in as the specific subscriber user, he or she can do anything with respect to the application that the subscriber user can do. This allows the support representative to analyze and debug the problem using their special knowledge as the publisher of the application while logged in as an actual user of the application. Upon completion of the diagnosis or upon termination of the access term, access to the support representative can be terminated, block 512.

The embodiment of the package support access framework illustrated in FIGS. 4 and 5 allows the ISV support representative to log into the installed application as a subscribed user without requiring the exchange of credentials between the ISV and the subscriber, the opening of a web conference session (e.g., WebEx session), and without the need to create or consume a user license for the support representative. This mechanism maintains the security of the application and the organization data within the multitenant database environment, and reduces overhead costs relating license fees and the like.

The package support access framework utilizing the support user interface also allows the creation and deployment of special debugging or diagnostic tools for each application that may be utilized by the organization administrators themselves. In this case, the multitenant platform administrator may monitor the applications for each organization and provide debugging tools that can be used by support users using the metadata alone. For example, the tools can gather data relating to process triggers and the like to allow metadata users with tools to allow the subscribers to debug issues directly.

In general, access provisioning is the mechanism by which third party (e.g., ISV) users can view/modify an organization's metadata in the multi-tenant system. The users with this special capability can be referred to as "sys admin" users. An ISV or other organization that has one or more sys admin users may be referred to as a "sys admin" organization. Therefore, there is one sys admin organization on each instance. In order to view the metadata of an organization, sys admin users must first login to the sys admin organization hosted by the instance and then they can view metadata of the other organization using a defined http URL address.

Figure 7:
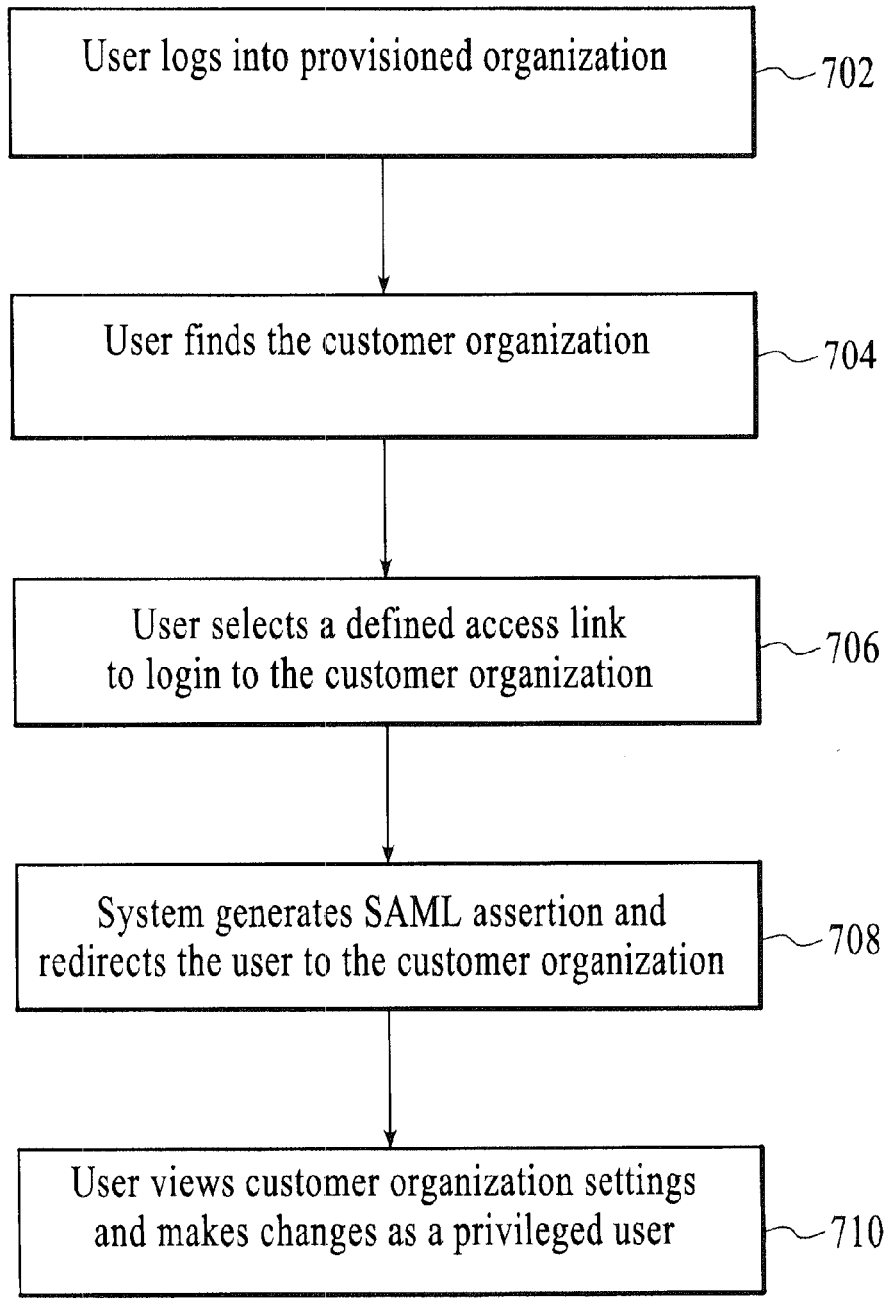
FIG. 7 is a flowchart that illustrates a typical workflow process for sys admin users, under an embodiment.

FIG. 7 is a flowchart that illustrates a typical workflow process for sys admin users, under an embodiment. As illustrated in FIG. 7, the process begins with the user logging into the sys admin organization, block 702. In the user interface of the sys admin organization, the user locates and selects the customer organization to access, block 704. A URL or other link may be provided for the user to actually initiate access, block 706. Upon selection of this access link, the metadata access component in the system generates a SAML assertion to redirect the user to the customer organization, block 708. Once the user is logged into the customer organization, he or she may then view the customer organization metadata and other settings and make any required changes as a privileged user within that organization, block 710. Depending on actual configuration settings, the user interface may generate a new browser tab for the user and log the user into the customer organization. After completion of any modifications, the user then logs out of the customer organization.

In an embodiment, the metadata access component 106 allows the ISV support representative or other third party to log into customer organizations 112 as an administrator (ADMIN) proxy user of the multi-tenant server system to view and edit organization metadata. To accommodate this functionality, new database columns for ADMIN permissions and setting levels are added to the user session table for the multi-tenant server. Depending on actual implementation, and admin_users table can be used for configuration, and a user_session table can be used for runtime. For non-sys admin user sessions, the values in these new columns will be null. When a user session is established, the system populates user_session table with appropriate values. The admin table provides the permissions regardless of where the sys admin user is in the system, and there is no need for admin_users table replication as the admin permissions and settings are pushed with the SAML assertion. An audit trail can be used to record the sys admin user making the changes.

In an embodiment, different support representatives can login as the same support user with different privileges and enforce and distinguish those privileges at runtime. Such a login can be done either simultaneously or one at a time. Thus, two support representatives can both login simultaneously as the same support user, and even though both are logged in as support user at the same time, each support user session gets different privileges based on the real user privileges. For example, if a first support representative has permissions x, y, z and a second support representative has only permission x, when the first support rep makes a request to create a session as support user, his session privileges will give permissions x, y and z, whereas when the second support rep makes a request to create the session, his session privileges will be restricted to only permission x.

In general, the privileges for the support user session are equal to the base restricted privileges of support user (which is metadata of the organization) plus the administrative privileges of the user requesting the support user session creation. Each administrative user has different privileges and by tying it with the session the system can enforce different permissions even though the support user is the same.

The PSA system that utilizes the access provisioning mechanism may include a user interface that is provided to users of the system to utilize this functionality. A user login interface may be provided that lets ISV support representatives or technical personnel select a customer organization and assume the identity of a specific user within the organization.

As described with respect to the embodiment illustrated in FIG. 5, the package support access framework involves the grant of access to the ISV LMO on both the organization level to the ISV LMO, block 506, and on a user-level for the specific technical personnel, block 508. This access grant structure permits two things: 1) browsing the organization area under App Setup and 2) using login-as end user in the organization.

Figure 8:
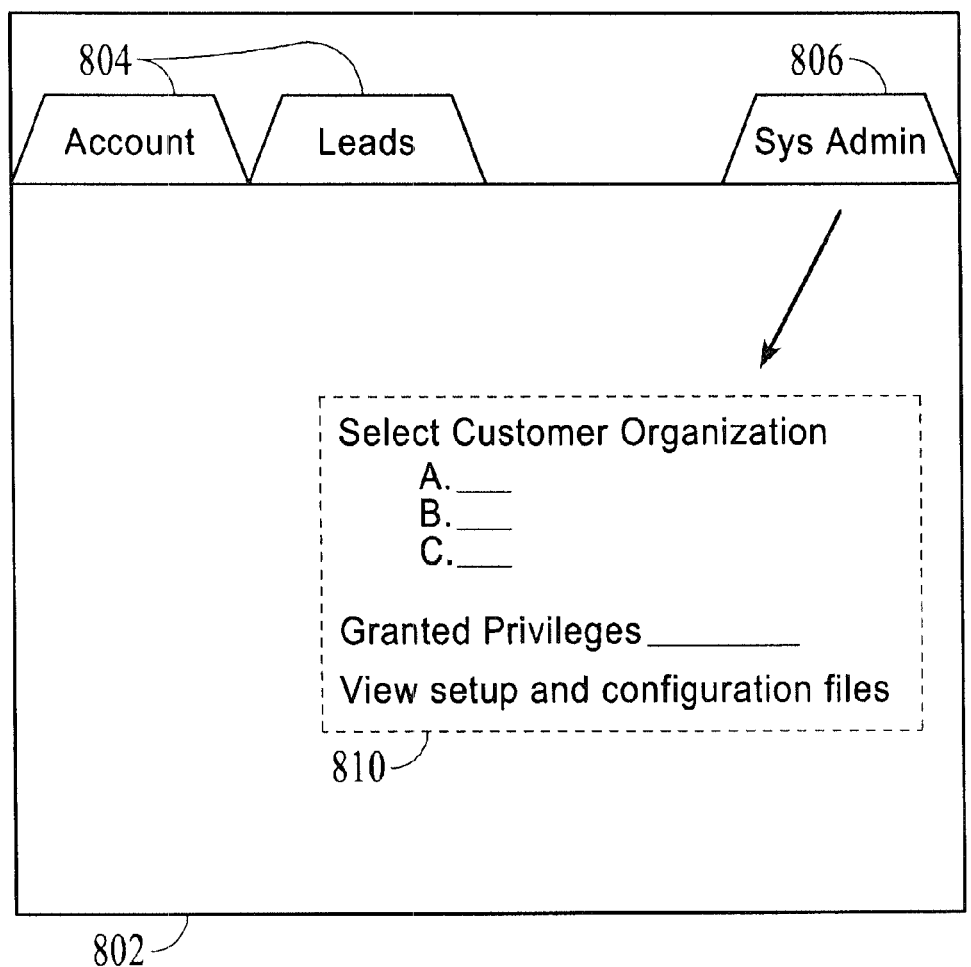
FIG. 8 is an example top-level web page for a customer organization that has a system administrator tab providing access provisioning, under an embodiment

In a typical implementation, the organization and ISVs interface through a web-based graphical user interface. FIG. 8 is an example top-level web page for a customer organization that has a system administrator tab providing access provisioning, under an embodiment. The example web page 802 of FIG. 8 represents the main user interface page for an ISV and/or customer organization user of the multi-tenant database system 100, under an embodiment. The main page has a number of links or tabs to subpages that provide access to various functions of the organization. For the example organization of FIG. 8, tabs 804 may be provided for functions such as Account Management, Leads, Opportunities, Contact Management, and so on. The top level page 802 also provides a SYS ADMIN tab 806 for the user to access the system administrator functions of the organization. The SYS ADMIN tab 806 provides access to an interface screen 810 that allows the user to select a customer organization to access, and that displays and/or provides commands to set other relevant parameters regarding the user's access. These can include a listing of the possible support user identities, a view of the granted privileges, and options regarding the viewing and modification of the selected customer organization metadata or setup and configuration files. In certain cases, the access provision may be configured to provide access only to certain parts of an organization (certain files, accounts, etc.) as opposed to the entire organization. It may also be configured to confer only limited access, such as: read only, limited write, install debug tools only, and so on. In most cases, a sys admin user will be granted all of the privileges as a support user assuming the identity of an actual organization user, and will be limited only by that particular user's limitations.

Figure 9:
FIG. 9 is an example web page for an ISV to login to an organization, under an embodiment.

Once the sys admin user is logged into the customer organization, he or she may be presented with standard user interface pages of that organization. FIG. 9 is an example web page for an ISV to login to an organization, under an embodiment. FIG. 9 illustrates a web page interface 900 that allows an ISV technical support representative with a PermitSubscriberLogin user permission to log into a subscriber organization on the Subscriber Support Tab. As shown in FIG. 9, and based on an example implementation, the Publisher's LMO has a tab called "Subscriber Support". This tab is available if the LMO organization has the LoginToSubscriber organization permission and the user has the PermitSubscriberLogin user perm. This tab displays a list in display area 902 of the subscriber organizations that have installed a license from the ISV, and have granted publisher login access privileges. If no subscribers have granted access, the message "no subscribers have granted access" is displayed. If there are one or more subscribers that have granted access, display area 902 shows a table with a login link, the subscriber organization name, the subscriber organization identifier, and the login access expiration date. When the "login" link is clicked, the user is directed into the appropriate subscriber organization support page.

Figure 10:
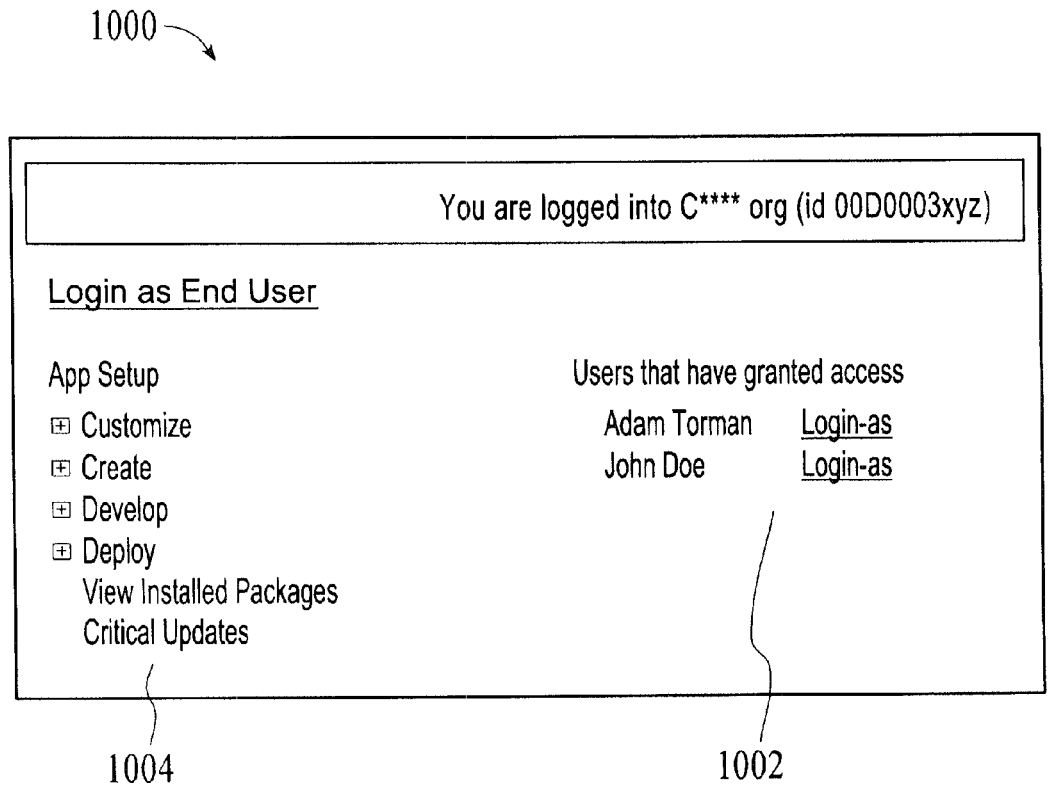
FIG. 10 is an example web page for a subscriber organization support page, under an embodiment.

FIG. 10 is an example web page for a customer organization support page, under an embodiment. This page is displayed to an ISV support representative for login as an end user when granted login access privileges as a specific organization user through the access provisioning method. As shown in FIG. 6, when an ISV support representative is logged into an organization, the logged in support representative sees a reminder that they are in a subscriber organization in bold red letters in the upper right of the screen. The text may read: "You are logged into [sub org name/sub org id]". This page 1000 is the launching point for diagnostic and debugging activities by the support representative in the organization resources. The display area 1002 displays a list of users that have granted login-as end user. No other usernames or profiles are accessible. In the sidebar 904 is displayed an App Setup tree, but the other elements of the tree are not displayed. There are no tabs displayed since the support representative may only visit pages under App Setup. ISV personnel that are logged into a subscriber organization, but have not yet logged in as an end user only have access to this page. They do not have any access to any other pages in the subscriber org. Above the App Setup tree in the sidebar is a link to the above page with the label "Login-as End User". ISV personnel that log into a subscriber organization have read-only access to the pages under Setup|App Setup, they do not have any access to other areas of setup, and they do not have any access to the customer's applications or data. This does not apply to ISV personnel that ultimately log in as a specific organization user or an end user.

System Overview

Figure 11:
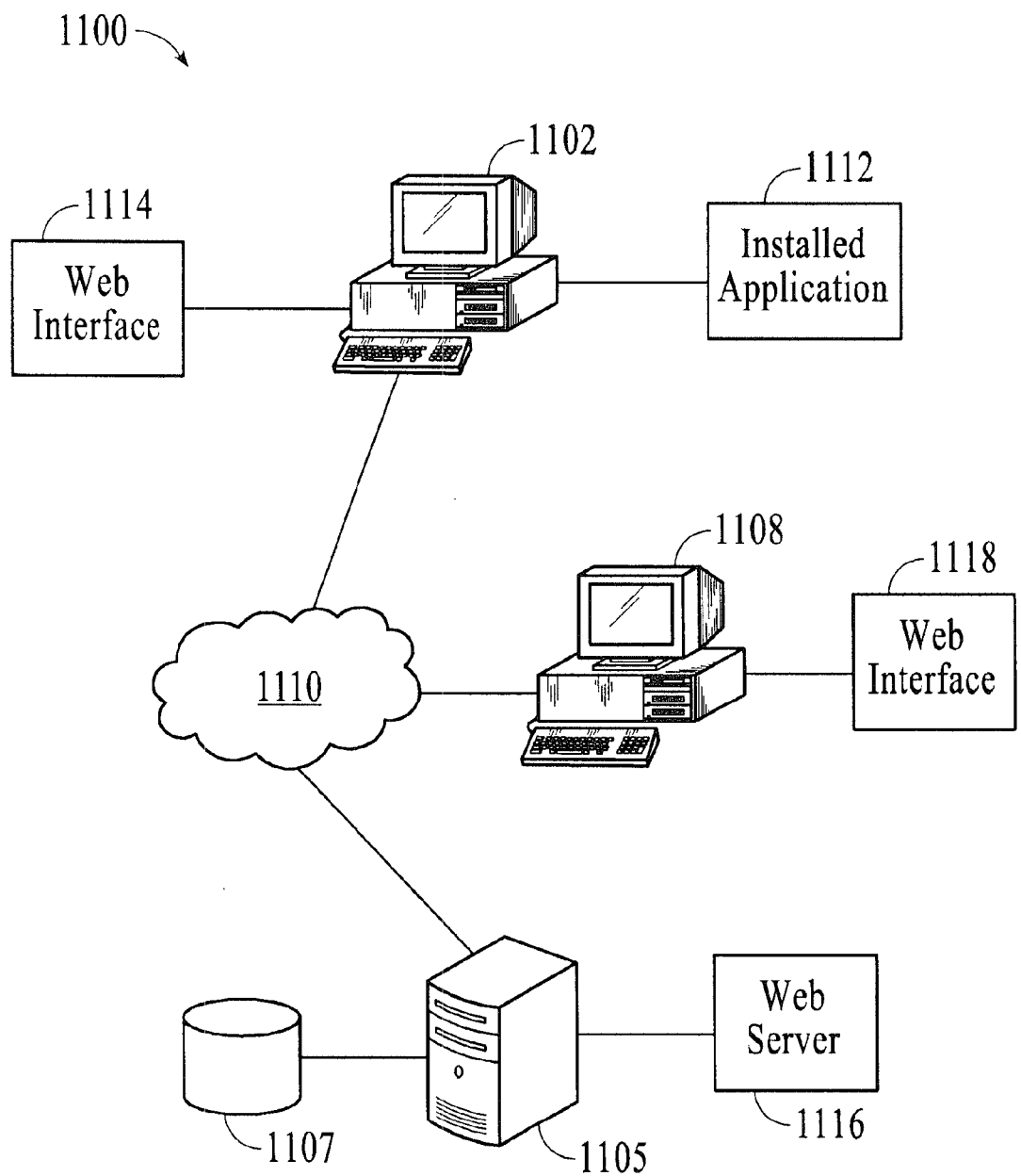
FIG. 11 is a block diagram of a computer network system that can implement embodiments of an access provisioning method for a package support access framework.

The package support access framework utilizing SAML-based access provisioning can be implemented in an Internet based client-server network system. FIG. 11 is a block diagram of a computer network system that can implement embodiments of such a package support access framework. In system 1100, a server computer 1105 that acts as a multi-tenant database platform is coupled to one or more networked computers 1102 and 1108 through a network 110. The network interface between server computer 1105 and computers 1102 and 1108 may include one or more routers (not shown) that serve to buffer and route the data transmitted among the computers. Network 110 may be the Internet, a Wide Area Network (WAN), a Local Area Network (LAN), or any combination thereof.

Computer 1105 is typically a server level computer capable of supporting multiple computers or terminals, and database storage resources 1107 or any similar computer capable of hosting applications and users over network 1110. The computers 1102 and 1108 of system 100 may each be a workstation computer or it may be a computing device such as a workstation, personal computer, notebook computer, personal digital assistant, or the like.

In a typical implementation, server computer 1105 may be a World-Wide Web (WWW) server that stores data in the form of web pages and transmits these pages as Hypertext Markup Language (HTML) files over the Internet 1110 to client computer 1102. In a web-based network in which network 1110 is the Internet, network server 104 executes a web server process 1116 to provide HTML documents, typically in the form of web pages, to client computers coupled to the network. To access the HTML files provided by server 1116, client computer 1102 executes a web browser process that provides a web interface 1114 to access web pages available on server 1105 and other Internet server sites, such as other content providers.

One or more of the computers in system 1100 may execute application programs to perform certain functions. The applications may be written and provided by an ISV that operates a networked computer 1108. The ISV also access and serves web pages using a web interface 1118. In a multi-tenant system, the applications 1112 are installed and executed within the organization resources 1120 in data store 1107 maintained by server computer 1105 for a user operating a computer or terminal device 1102. The ISV may be granted access to diagnose and debug problems associated with certain installed applications in accordance with the package support access framework described above, and through the example web page interfaces illustrated in FIGS. 7-10.

In one embodiment, the server 1154 is an enterprise server computer that provides comprehensive application and data management functions to a large number of client computers, such as client 1102. In this case, the client 1102 is operated by a subscriber organization for the benefit of their customers or end users. The server 1107 (which may be implemented as a plurality of separate server computers) functions as a platform for certain customer relationship management (CRM) and database management functions. CRM is generally understood to be a strategy for managing a company's interactions with customers, clients and sales prospects. The CRM platform includes components that organize, automate, and synchronize business processes, such as sales, marketing, customer service, technical support, and other similar activities. For the embodiment of FIG. 11, server 1105 may be embodied as an enterprise cloud computing server that distributes business software on a subscription basis and hosts applications offsite of the client 1102 site. These applications can be part of a CRM platform that is provided through a Software as a Service (SaaS) model in which software is deployed over the Internet 1110 and/or is deployed to run behind a firewall on the client 1102.

Embodiments of the application support structure can be used in any number IP based network environments. One such environment is a distributed database application that is implemented over a local or wide area network. One example of such an application is a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 12:
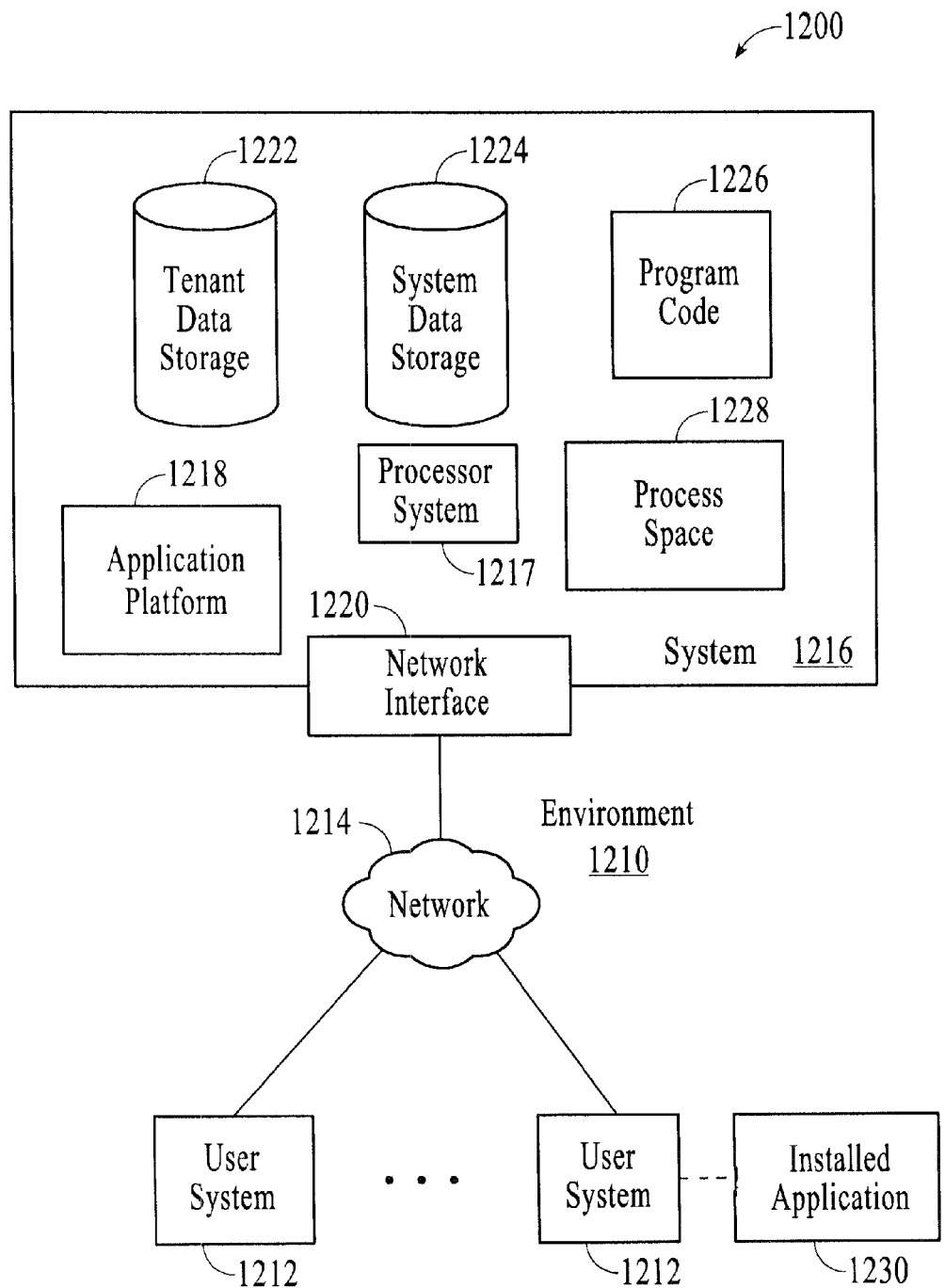
FIG. 12 is a block diagram illustrating an example of an on-demand database service implementing an embodiment of a package support access framework.

FIG. 12 is a block diagram illustrating an example of an on-demand database service implementing an embodiment of a multi-resource test system for testing multiple web serves and/or web sites in the system. FIG. 12 generally illustrates an overall system 1200 that includes an environment 1210 wherein an on-demand database service might be used. Environment 1210 may include user systems 1212, network 1214, system 1216, processor system 1217, application platform 1218, network interface 1220, tenant data storage 1222, system data storage 1224, program code 1226, and process space 1228. In other embodiments, environment 1210 may not have all of the components listed and/or may have other elements instead of, or in addition to, those listed above.

Environment 1210 is an environment in which an on-demand database service exists. User system 1212 may be any machine or system that is used by a user to access a database user system. For example, any of user systems 1212 can be a handheld computing device, a mobile phone, a laptop computer, a workstation, and/or a network of computing devices. As illustrated in FIG. 12, user systems 1212 might interact via a network 1214 with an on-demand database service, which is system 1216.

An on-demand database service, such as system 1216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the terms "on-demand database service 1216" and "system 1216" may be used interchangeably herein. A database image may include one or more database objects. A relational database management system (RDMS) or the equivalent may execute storage and retrieval of information against the database object(s). Application platform 1218 may be a framework that allows the applications of system 1216 to run, such as the hardware and/or software, e.g., the operating system. In an embodiment, on-demand database service 1216 may include an application platform 1218 that enables creation, managing and executing one or more applications developed by the provider of the on-demand database service, users accessing the on-demand database service via user systems 1212, or third party application developers accessing the on-demand database service via user systems 1212.

The users of user systems 1212 may differ in their respective capacities, and the capacity of a particular user system 1212 might be entirely determined by permissions (permission levels) for the current user. For example, where a salesperson is using a particular user system 1212 to interact with system 1216, that user system has the capacities allotted to that salesperson. However, while an administrator is using that user system to interact with system 1216, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1214 is any network or combination of networks of devices that communicate with one another. For example, network 1214 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1212 might communicate with system 1216 using TCP/IP and, at a higher network level, use other common Internet protocols to communicate, such as HTTP, FTP, AFS, WAP, etc. In an example where HTTP is used, user system 1212 might include an HTTP client commonly referred to as a web browser for sending and receiving HTTP messages to and from an HTTP server at system 1216. Such an HTTP server might be implemented as the sole network interface between system 1216 and network 1214, but other techniques might be used as well or instead. In some implementations, the interface between system 1216 and network 1214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1216, shown in FIG. 12, implements a web-based customer relationship management (CRM) system. For example, in one embodiment, system 1216 includes application servers configured to implement and execute CRM software applications as well as provide related data, code, web pages and other information to and from user systems 1212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1216 implements applications other than, or in addition to, a CRM application. For example, the system may provide tenant access to multiple hosted (standard and custom) applications, including a CRM application. User (or third party developer) applications, which may or may not include CRM, may be supported by the application platform 1218, which manages creation, storage of the applications into one or more database objects and executing of the applications in a virtual machine in the process space of the system 1216.

One arrangement for elements of system 1216 is shown in FIG. 12, including a network interface 1220, application platform 1218, tenant data storage 1222 for tenant data 1223, system data storage 1224 for system data accessible to system 1216 and possibly multiple tenants, program code 1226 for implementing various functions of system 1216, and a process space 1228 for executing MTS system processes and tenant-specific processes, such as running applications as part of an application hosting service. Additional processes that may execute on system 1216 include database indexing processes.

The applications 1218 within system 1216 each represent a set of operations that interact with system components and user systems 1212 through one or more operational interfaces. As described above, the applications may be provided as part of a package that is developed by an ISV for installation on subscriber sites. The installed applications 1230 may be accessed and debugged by ISV support representatives directly accessing the applications after being granted access by subscriber administrators in accordance with the package support access framework described above. The normal use of such applications may be implemented in the multitenant database environment in accordance with embodiments described below with respect to the system 1200 of FIG. 12.

Several elements in the system shown in FIG. 12 include conventional, well-known elements that are explained only briefly here. For example, each user system 1212 could include a desktop personal computer, workstation, laptop, PDA, cell phone, or any wireless access protocol (WAP) enabled device or any other computing device capable of interfacing directly or indirectly to the Internet or other network connection. User system 1212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1212 to access, process and view information, pages and applications available to it from system 1216 over network 1214. Each user system 1212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1216 or other systems or servers. For example, the user interface device can be used to access data and applications hosted by system 1216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1212 and all of its components are operator configurable using applications, such as a browser, including computer code run using a central processing unit. Similarly, system 1216 (and additional instances of an MTS, where more than one is present) and all of their components might be operator configurable using application(s) including computer code to run using a central processing unit such as processor system 1217. A computer program product embodiment includes a machine-readable storage medium (media) having instructions stored thereon/in which can be used to program a computer to perform any of the processes of the embodiments described herein. Computer code for operating and configuring system 1216 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1216 is configured to provide web pages, forms, applications, data and media content to user (client) systems 1212 to support the access by user systems 1212 as tenants of system 1216. As such, system 1216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

In certain embodiments, user systems 1212 (which may be client systems) communicate with application servers to request and update system-level and tenant-level data from system 1216 that may require sending one or more queries to tenant data storage 1222 and/or system data storage 1224. System 1216 may automatically generate one or more SQL statements (e.g., one or more SQL queries) that are designed to access the desired information. System data storage 1224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

For the purpose of the present description, a data object is any type of distinguishable data or information, such as an image, video, sound, text, or other type of data. A data object may include multiple types of distinguishable data, such as an image combined with descriptive text, and it may also comprise a dynamic signal such as a time varying signal. A data object as used herein is to be interpreted broadly to include stored representations of data including for example, digitally stored representations of source information. A data set is a collection of data objects, and may comprise a collection of images, or a plurality of text pages or documents. A user is utilized generically herein to refer to a human operator, a software agent, process, or device that is capable of executing a process or control.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for controlling access to data for an organization stored in a multi-tenant system hosted on a server computer accessible over a network, the method comprising:
    defining administrative privileges for a support user within a management organization that maintains the data for the organization stored in the multi-tenant system on the server computer, wherein the support user is authorized to access the data of the organization according to the defined administrative privileges;
    defining a support user class of users in an interface to the organization that includes representatives of an independent software vendor (ISV) that provided a multi-tenant database application maintained by a platform provider, wherein a member of the support user class is granted limited privileges with respect to the data;
    generating a Security Assertion Markup Language (SAML) assertion upon request of an ISV support representative to enable access to the data to the extent of the granted limited privileges, the SAML assertion establishing the identity of the ISV support representative and the platform provider serves as an identity provider under a SAML protocol to authorize the ISV support representative to perform maintenance functions for the multi-tenant database application;
    initiating a network session to the organization upon request of the ISV support representative, wherein the network session associates the administrative privileges to the support user class to enable access to the data to the extent of the administrative privileges;
    granting access to the multi-tenant database application to the ISV support representative as an organization user for a limited term, wherein the ISV support representative is granted use privileges of the multi-tenant database application; and
    allowing the ISV support representative to use the multi-tenant database application as an organization user for the limited term.

2. The method of claim 1 wherein the data of the organization comprises at least one of: metadata related to usage parameters of the organization to resources of the system, and metadata of the multi-tenant database application installed for use by the organization.

3. The method of claim 2 wherein the multi-tenant database application is a hosted application comprising part of a package of one or more programs accessible to the organization through login credentials established by the platform provider.

4. The method of claim 3 wherein the ISV support representative is granted privileges allowing the support representative to view and modify the metadata in relation to performing debugging functions on the multi-tenant database application.

5. The method of claim 4 comprising:
    allowing the support user to access organization metadata as the organization user for the limited term.

6. The method of claim 1 further comprising:
    providing a user interface allowing the ISV support representative to select a customer organization to access as a support user; and
    generating the SAML assertion upon selection of a uniform resource locator on the user interface by the ISV support representative.

7. A system for controlling access to application program data in a computer network, comprising:
    a central processing unit (CPU); and
    a non-transitory computer readable medium storing a plurality of instructions, which when executed, cause the central processing unit to:
    define administrative privileges for a support user within a management organization that maintains the data for the organization stored in the multi-tenant system on the server computer, wherein the support user is authorized to access the data of the organization according to the defined administrative privileges;
    define a support user class of users in an interface to the organization that includes representatives of an independent software vendor (ISV) that provided a multi-tenant database application maintained by a platform provider, wherein a member of the support user class is granted limited privileges with respect to the data;
    generate a Security Assertion Markup Language (SAML) assertion upon request of an ISV support representative to enable access to the data to the extent of the granted limited privileges, the SAML assertion establishing the identity of the ISV support representative and the platform provider serves as an identity provider under a SAML protocol to authorize the ISV support representative to perform maintenance functions for the multi-tenant database application;
    initiate a network session to the organization upon request of the ISV support representative, wherein the network session associates the administrative privileges to the support user class to enable access to the data to the extent of the administrative privileges;
    grant access to the multi-tenant database application to the ISV support representative as an organization user for a limited term, wherein the ISV support representative is granted use privileges of the multi-tenant database application;
    allow the ISV support representative to use the multi-tenant database application as an organization user for the limited term.

8. The system of claim 7 wherein a hosted application comprises a package of one or more programs accessible to the organization through login credentials established by the platform provider.

9. The system of claim 7 wherein the data comprises metadata of the multi-tenant database application installed for use by the organization.

10. The system of claim 9, wherein instructions, when executed, further cause one or more processors to:
define administrative privileges of the ISV support representative within the platform;
generate a SAML assertion upon an http request to the organization by the support user initiating a web access to the organization; and
associate the administrative privileges of the ISV support representative with the http request for use during the web access to the organization.

11. A computer program product comprising machine-readable program code stored on a non-transitory computer-readable medium to be executed by one or more processors, the program code including instructions to:
define administrative privileges for a support user within a management organization that maintains the data for the organization stored in the multi-tenant system on the server computer, wherein the support user is authorized to access the data of the organization according to the defined administrative privileges;
define a support user class of users in an interface to the organization that includes representatives of an independent software vendor (ISV) that provided a multi-tenant database application maintained by a platform provider, wherein a member of the support user class is granted limited privileges with respect to the data;
generate a Security Assertion Markup Language (SAML) assertion upon request of an ISV support representative to enable access to the data to the extent of the granted limited privileges, the SAML assertion establishing the identity of the ISV support representative and the platform provider serves as an identity provider under a SAML protocol to authorize the ISV support representative to perform maintenance functions for the application;
initiate a network session to the organization upon request of the ISV support representative, wherein the network session associates the administrative privileges to the support user class to enable access to the data to the extent of the administrative privileges;
grant access to the multi-tenant database application to the ISV support representative as an organization user for a limited term, wherein the ISV support representative is granted use privileges of the application; and
allow the ISV support representative to use the multi-tenant database application as an organization user for the limited term.

12. The computer program product of claim 11 wherein the data comprises one of: metadata related to system resource usage by the organization, and metadata of the multi-tenant database application installed for use by the organization.

13. The computer program product of claim 12, wherein the multi-tenant database application is a hosted application comprising part of a package of one or more programs accessible to the organization through login credentials established by the platform provider.

14. The method of claim 13 wherein the ISV support representative is granted privileges allowing the support representative to view and modify the metadata in relation to performing debugging functions on the multi-tenant database application.

* * * * *